United States Patent
Yamada et al.

(10) Patent No.: US 10,760,642 B2
(45) Date of Patent: Sep. 1, 2020

(54) LIQUID-FILLED VIBRATION ISOLATOR

(71) Applicant: Toyo Tire Corporation, Itami-shi, Hyogo (JP)

(72) Inventors: Norifumi Yamada, Itami (JP); Gen Isawa, Itami (JP)

(73) Assignee: TOYO TIRE CORPORATION, Itami-shi, Hyogo (JP)

( * ) Notice: Subject to any disclaimer, the term of this patent is extended or adjusted under 35 U.S.C. 154(b) by 30 days.

(21) Appl. No.: 16/263,057

(22) Filed: Jan. 31, 2019

(65) Prior Publication Data

US 2019/0360551 A1 Nov. 28, 2019

(30) Foreign Application Priority Data

May 24, 2018 (JP) ................................ 2018-099506

(51) Int. Cl.
  *F16F 13/14* (2006.01)
  *F16F 13/00* (2006.01)

(52) U.S. Cl.
  CPC ...... *F16F 13/1409* (2013.01); *F16F 13/1454* (2013.01); *F16F 13/1463* (2013.01)

(58) Field of Classification Search
  CPC . F16F 13/1409; F16F 13/1454; F16F 13/1463
  See application file for complete search history.

(56) References Cited

U.S. PATENT DOCUMENTS

| 4,858,899 | A | * | 8/1989 | Saotome | ................ | B60G 7/006 |
|---|---|---|---|---|---|---|
| | | | | | | 267/219 |
| 5,375,822 | A | * | 12/1994 | Hirasawa | .............. | F16F 13/262 |
| | | | | | | 267/140.15 |
| 2006/0071379 | A1 | * | 4/2006 | Kato | ................... | F16F 13/1409 |
| | | | | | | 267/140.11 |
| 2007/0216074 | A1 | * | 9/2007 | Loheide | .................. | F16F 13/28 |
| | | | | | | 267/140.5 |
| 2009/0189323 | A1 | * | 7/2009 | Endo | ................... | F16F 13/1409 |
| | | | | | | 267/140.12 |

FOREIGN PATENT DOCUMENTS

JP 2009-180238 A 8/2009

* cited by examiner

*Primary Examiner* — Melody M Burch
(74) *Attorney, Agent, or Firm* — Westerman, Hattori, Daniels & Adrian, LLP (57) ABSTRACT

The present invention provides a liquid-filled vibration isolator with improved durability. The liquid-filled vibration isolator includes a shaft unit, a first unit, an elastic body coupling the first unit and shaft unit, and a second unit mounted radially outside the first unit. The first unit includes a pair of annular elements, a pair of coupling elements coupling the annular elements, while the elastic body includes outer face portions bonded to outer surfaces of the coupling elements. The outer face portions include lips making contact with the second unit, and first segments making contact with the second unit on areas larger than the lips. The second unit restrains the annular elements along the entire circumferences, and compresses the lips and first segments in the radial direction.

7 Claims, 7 Drawing Sheets

LIQUID-FILLED VIBRATION ISOLATOR

TECHNICAL FIELD

This invention relates to liquid-filled vibration isolators, and more particularly to a liquid-filled vibration isolator with improved durability.

BACKGROUND ART

One of the well-known devices for elastically supporting vibrating objects, such as a suspension member and an engine, on a vehicle body, is a liquid-filled vibration isolator that dampens vibrations by means of a resonance phenomenon of liquid (Patent Literature 1). In the technique disclosed in Patent Literature 1, a hollow cylindrical first unit and a shaft unit are coupled with a rubber-like elastic body to form an intermediate unit, and a hollow cylindrical second unit is disposed radially outside the intermediate unit. The first unit includes a pair of annular elements, and a pair of coupling elements which couple the annular elements and are opposed to each other with respect to an axis. The elastic body includes first wall portions coupling the annular elements to the shaft unit, and second wall portions coupling the coupling elements to the shaft unit. The elastic body is integrally-molded with the first and second wall portions, and is bonded by vulcanization to the shaft unit and the first unit. After the intermediate unit is inserted into the second unit, the second unit is drawn to be smaller in diameter, thereby manufacturing a liquid-filled vibration isolator having liquid chambers formed in the first wall portions and defined by the second wall portions.

CITATION LIST

Patent Literature

[Patent Literature 1] Japanese Unexamined Patent Application Publication No. 2009-180238

SUMMARY OF INVENTION

Technical Problem

However, in the aforementioned related art, the annular elements may be deformed due to mold shrinkage of the second wall portions of the elastic body bonded by vulcanization, and consequently the annular elements may sometimes have smaller diameters at parts thereof connected to the coupling elements in comparison with the other parts. If the second unit mounted around the intermediate unit is drawn, the drawing ratio (diameter before drawing/diameter after drawing) of the parts of the annular elements to which the coupling elements are connected becomes lower than the drawing ratio of the other parts of the annular elements. As a result, the radial compressive load applied by the second unit onto the second wall portions may become small, which easily induces tensile strain in the second wall portions (elastic body), thereby decreasing the durability.

The present invention has been made to solve the aforementioned problem, and has an object to provide a liquid-filled vibration isolator with improved durability.

Solution to Problem

To achieve the object, the liquid-filled vibration isolator of the present invention includes a shaft unit extending in the direction of an axis, a hollow cylindrical first unit enclosing the shaft unit, an intermediate unit having an elastic body coupling the first unit to the shaft unit, and a hollow cylindrical second unit disposed radially outside the intermediate unit. The first unit includes a pair of annular elements spaced apart from each other in the axis direction, a pair of coupling elements coupling the annular elements and being opposed to each other with respect to the axis, while the elastic body includes a pair of first wall portions coupling the annular elements to the shaft unit along the entire circumferences of the annular elements, and second wall portions integrally-molded with the first wall portions and coupling the coupling elements to the shaft unit. The liquid-filled vibration isolator has an orifice in communication with liquid chambers defined by the second wall portions.

The elastic body includes outer face portions bonded to outer surfaces of the coupling elements. The outer face portions include lips making contact with the second unit, and first segments provided at different positions from the lips and making contact with the second unit on areas larger than the lips. The second unit restrains the annular elements along the entire circumferences, and compresses the lips and first segments in the radial direction.

Advantageous Effects of Invention

According to the liquid-filled vibration isolator in the first aspect, the outer face portions of the elastic body bonded to the outer surfaces of the coupling elements have the first segments provided at different positions from the lips making contact with the second unit. The contact area of the first segments with the second unit is larger than the contact area of the lips with the second unit. Since the second unit restrains the annular elements along the entire circumferences, and compresses the lips and first segments in the radial direction, the second unit can apply a radial compressive load to the second wall portions through the first segments. This can make it difficult to create tensile strain in the second wall portions (elastic body), and therefore the durability can be improved.

According to the liquid-filled vibration isolator in the second aspect, before the intermediate unit is placed inside the second unit, first distances from the axis to radially outer surfaces of the first segments are equal to or longer than second distances from the axis to radially outer ends of the lips. This allows the second unit to apply a compressive load to the first segments without providing radially inward projections to the second unit to compress the first segments. Because there is no need to provide the radially inward projections to the second unit, the second unit can be mounted outside the intermediate unit without consideration of the orientation of the second unit. In addition to the effect of the first aspect, the liquid-filled vibration isolator in the second aspect can improve the workability of attaching the second unit to the intermediate unit.

According to the liquid-filled vibration isolator in the third aspect, the outer face portions further include second segments provided at different positions from the first segments, and a groove is formed on the border between the second segment and first segment. The groove extends in the direction orthogonal to the axis and serves as an orifice between the outer face portion and second unit. Before the intermediate unit is placed inside the second unit, the distances from the axis to radially outer surfaces of the second segments are shorter than the distances from the axis to radially outer surfaces of the first segments. Furthermore, the second segments are thinner in the radial direction than the first segments, and therefore the deformation amounts of the second segments can be less than those of the first segments. As a result, the cross-sectional area of the orifice cannot be easily reduced by deformation of the outer face portion when the intermediate unit is inserted into the second unit with the second segments side first while the outer face portions of the intermediate unit make contact with the second unit. The cross-sectional area of the orifice does not greatly deviate from the designed value. Therefore, in addition to the effect of the first aspect, the liquid-filled vibration isolator in the third aspect can reduce the deviation from the designed values of dynamic spring constant and damping coefficient in association with liquid motion.

According to the liquid-filled vibration isolator in the fourth aspect, the second segments are shorter in the axis direction than the first segments. Therefore, the cross-sectional areas of the second wall portions on which the compressive load is applied can be expanded in comparison with the case where the second segments are equal in axial length to the first segments. As a result, this can make it difficult to create tensile strain in the second wall portions, and therefore, in addition to the effect of the third aspect, the liquid-filled vibration isolator in the fourth aspect can improve the durability of the second wall portions.

According to the liquid-filled vibration isolator in the fifth aspect, intermediate plates which are more rigid than the elastic body are interposed between the shaft unit and first unit and embedded in the second wall portions (elastic body). Thus, in addition to the effect of the first aspect, the liquid-filled vibration isolator in the fifth aspect can readily increase the static spring constant.

According to the liquid-filled vibration isolator in the sixth aspect, the second wall portions have inner walls between the shaft unit and the intermediate plates, and outer walls between the intermediate plates and first unit, and the inner walls are thinner in the radial direction than the outer walls. This can make the mold shrinkage of the outer walls of the second wall portions greater than that of the inner walls of the second wall portions. After the intermediate unit is inserted into the second unit, the second unit can readily apply a compressive load onto the outer walls. As a result, the tensile strain in the second wall portions caused by the mold shrinkage can be reduced. Thus, in addition to the effect of the fifth aspect, the liquid-filled vibration isolator in the sixth aspect can have durability.

DESCRIPTION OF EMBODIMENTS

Figure 1:
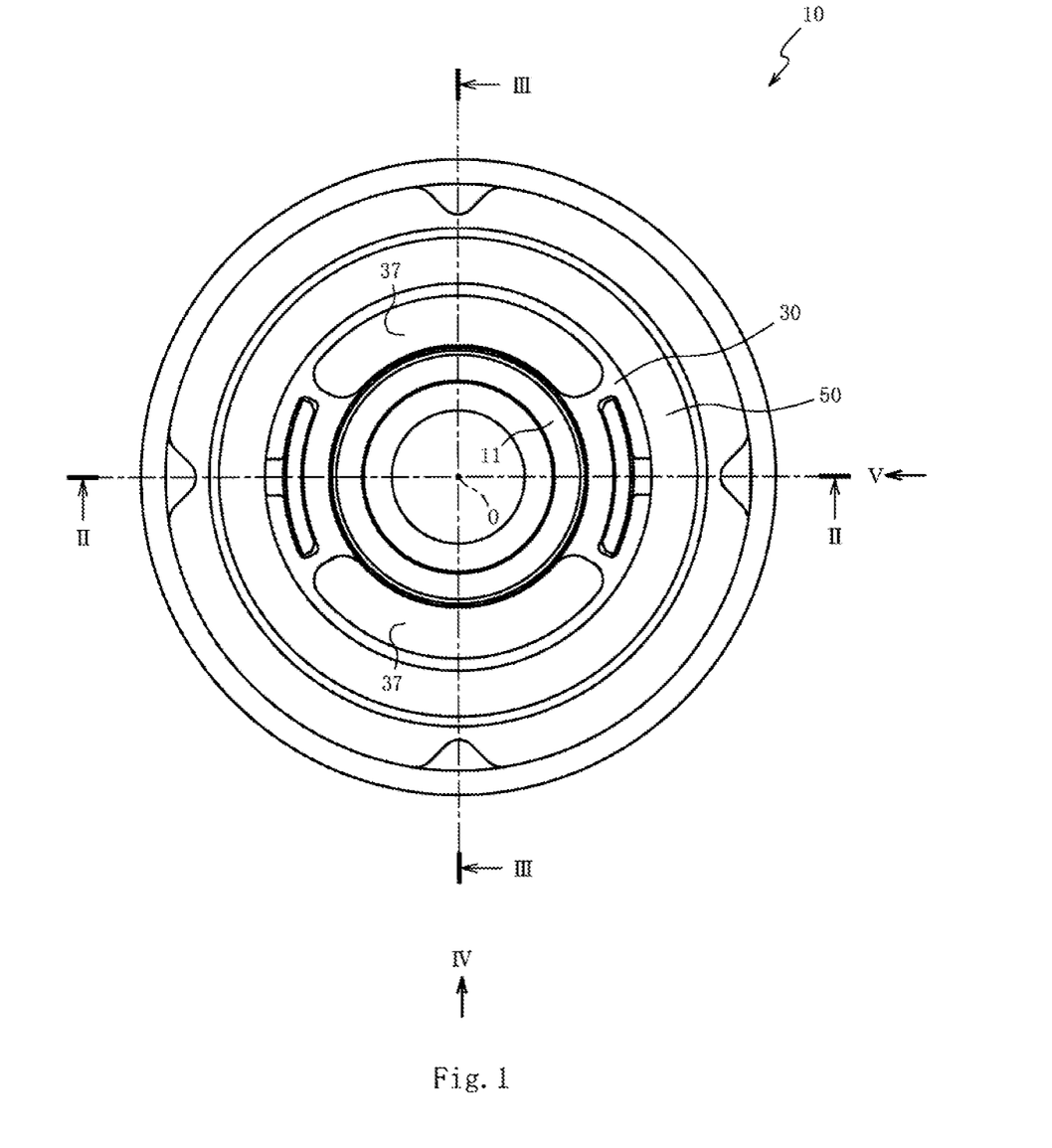
FIG. 1 is a plan view of a liquid-filled vibration isolator according to an embodiment of the present invention.
Figure 2:
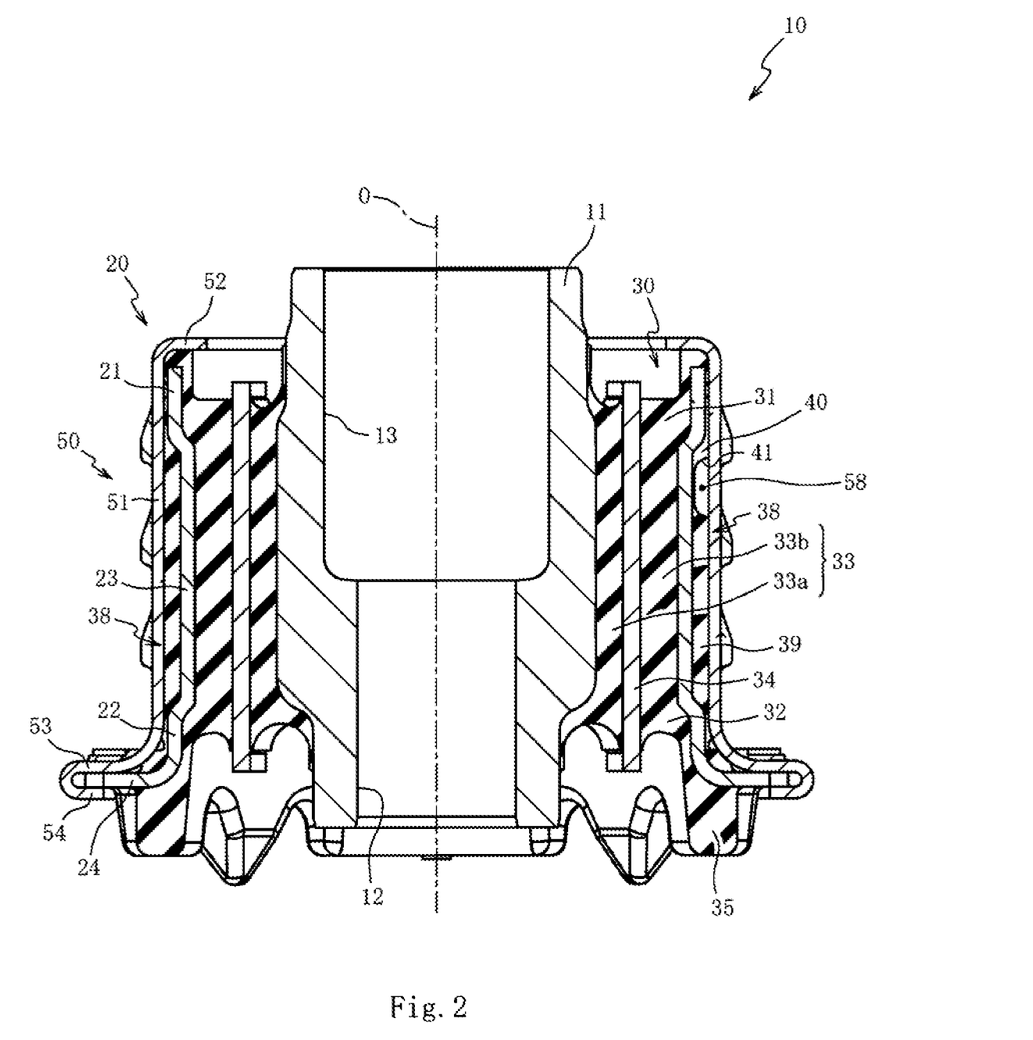
FIG. 2 is a cross-sectional view of the liquid-filled vibration isolator taken along Line II-II in FIG. 1.
Figure 3:
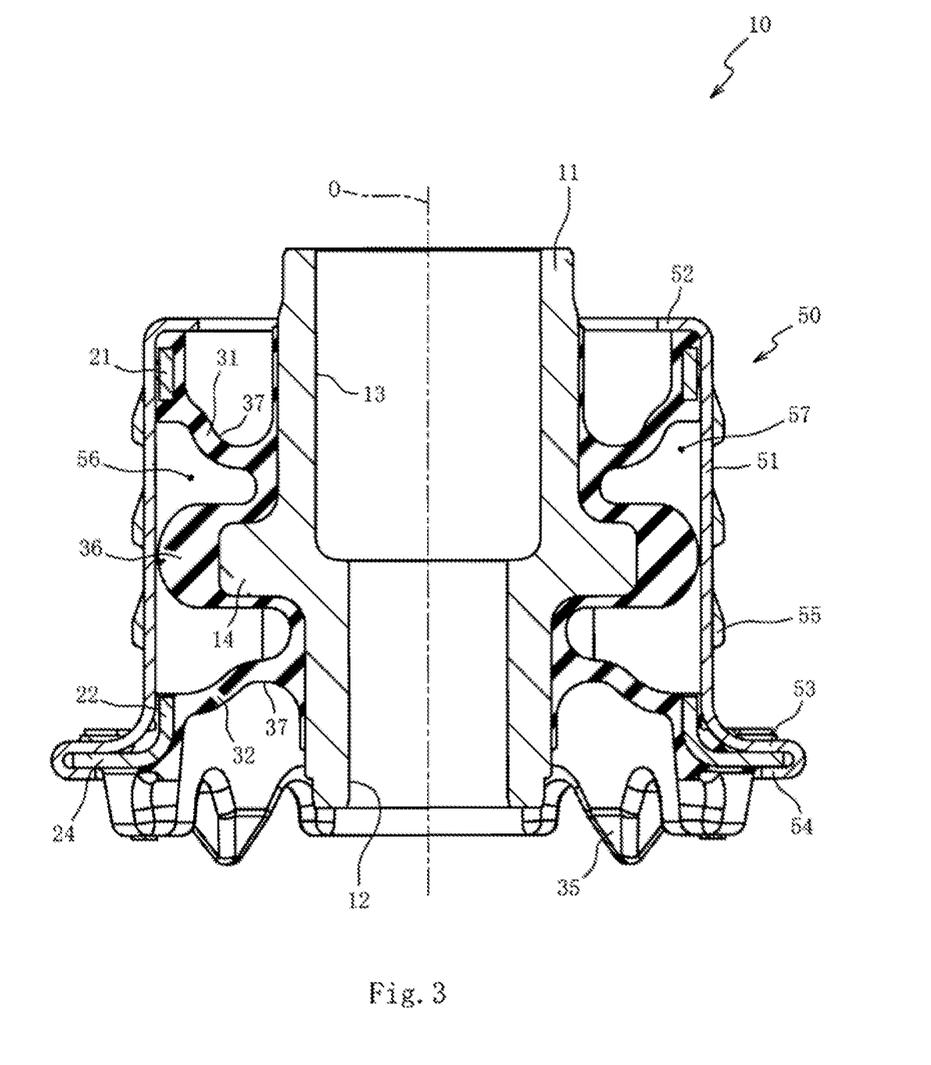
FIG. 3 is a cross-sectional view of the liquid-filled vibration isolator taken along Line III-III in FIG. 1.

With reference to the accompanying drawings, a preferred embodiment of the present invention will be described below. FIG. 1 is a plan view of a liquid-filled vibration isolator 10 according to an embodiment of the present invention, FIG. 2 is a cross-sectional view of the liquid-filled vibration isolator 10 taken along Line II-II in FIG. 1 and illustrated with an O axis, and FIG. 3 is a cross-sectional view of the liquid-filled vibration isolator 10 taken along Line III-III in FIG. 1 and illustrated with the O axis. In this embodiment, the liquid-filled vibration isolator 10 is a body mount that elastically supports a suspension or other components, which support road wheels of an automobile, on the vehicle body.

As shown in FIGS. 1 to 3, the liquid-filled vibration isolator 10 includes a tubular shaft unit 11 that is made of a rigid material such as metal, a hollow cylindrical first unit 20 that is made of a rigid material, such as metal, and spaced apart from the shaft unit 11, a rubber-like elastic body 30 that is interposed between the shaft unit 11 and first unit 20 to connect the shaft unit 11 to the first unit 20, and a hollow cylindrical second unit 50 that is made of a rigid material, such as metal, and disposed radially outside the first unit 20. In this embodiment, a vehicle body component (not shown) is secured to the shaft unit 11, while a suspension member (not shown), which is a vibrating object, is secured to the second unit 50.

The shaft unit 11 is a tubular member extending in the O-axis direction and has a hole 12 formed along the O axis. The shaft unit 11 has a large-diameter portion 13 communicating with the hole 12 in the O-axis direction. The large-diameter portion 13 has a diameter larger than the diameter of the hole 12. The hole 12 is an area into which a bolt (not shown) is inserted. The large-diameter portion 13 is an area into which a part of a vehicle body component (not shown) is inserted. The bolt inserted in the hole 12 is threadedly engaged in a screw hole formed in the vehicle body component inserted in the large-diameter portion 13 to secure the shaft unit 11 to the vehicle body component. The shaft unit 11 has a pair of protrusions 14 (see FIG. 3) that are located on the opposite sides of the center part in the O-axis direction and stick out radially outward in opposite directions with respect to the O axis.

The first unit 20 is a hollow cylindrical member disposed radially outside the shaft unit 11. The first unit 20 includes a pair of annular elements 21, 22 spaced apart from each other in the O-axis direction, and a pair of coupling elements 23 coupling the annular elements 21, 22. The annular elements 21, 22 are formed into a tubular shape with a strip-like material, while the coupling elements 23 are formed into an arc shape with a strip-like material wider than the annular elements 21, 22. The coupling elements 23 are connected to parts of the edges of the annular elements 21, 22 in the O-axis direction. The coupling elements 23 are spaced apart from each other in the circumferential direction and opposed to each other with respect to the O axis. The annular elements 21, 22 have the same diameter.

In this embodiment, as shown in FIG. 2, the distances from the O axis to the coupling elements 23 (the radii of the arcs of the coupling elements 23) are shorter than the distances from the O axis to the annular elements 21, 22 (the radii of the annular elements 21, 22). The radii of the coupling elements 23 are constant along the entire length of the coupling elements 23 in the O-axis direction. The first unit 20 includes a flange 24 formed along the entire circumference of the annular element 22. The flange 24 projects like a brim from an edge of the annular element 22, the edge being opposed to the other edge of the annular element 22 connected to the coupling elements 23 in the O-axis direction.

The elastic body 30 is a rubber-like member elastically supporting the first unit 20 to the shaft unit 11, and is bonded by vulcanization to the shaft unit 11 and first unit 20. The elastic body 30 includes a pair of first wall portions 31, 32 respectively coupling the shaft unit 11 to the annular elements 21, 22 along the entire circumferences, and second wall portions 33 integrally molded with the first wall portions 31, 32 and coupling the coupling elements 23 to the shaft unit 11 (see FIG. 2).

The first wall portions 31, 32 are disk-like members disposed on the opposite sides of the shaft unit 11 in the O-axis direction. On the outer end surfaces of the first wall portions 31, 32 in the O-axis direction, depressed portions (recesses) 37 are formed that are opposed to each other with respect to the shaft unit 11 and recessed inwardly in the O-axis direction (see FIG. 3). The depressed portions 37 are formed to reduce the spring constant of the elastic body 30 in the direction in which the depressed portions 37 are formed (up-down direction in FIG. 1).

The second wall portions 33 (see FIG. 2) are bonded by vulcanization to the shaft unit 11 and coupling elements 23, and are integrally molded with the first wall portions 31, 32. The second wall portions 33 can make the spring constant higher in the direction in which the second wall portions 33 extend (right-left direction in FIG. 1) than in the direction orthogonal thereto (in the direction in which the depressed portions 37 are formed).

In the second wall portions 33 embedded are intermediate plates 34 which are plate member made of a rigid material, such as metal. The intermediate plates 34 can increase the spring constant in the direction in which the second wall portions 33 extend (right-left direction in FIG. 1). In this embodiment, the intermediate plates 34 are plate materials curved circumferentially along the shaft unit 11.

The second wall portions 33 are partitioned by the intermediate plates 34 into inner walls 33a between the shaft unit 11 and intermediate plates 34, and outer walls 33b between the intermediate plates 34 and the first unit 20 (coupling elements 23). The inner walls 33a are thinner in the radial direction (right-left direction in FIG. 2) than the outer walls 33b.

In this embodiment, the second wall portions 33 are disposed in the right-left direction of the vehicle (the right-left direction in FIG. 1), and the depressed portions 37 are disposed in the front-rear direction of the vehicle (the up-down direction in FIG. 1). The liquid-filled vibration isolator 10 disposed as described above can provide soft spring in the front-rear direction of the vehicle as well as hard spring in the right-left direction of the vehicle. As a result, the liquid-filled vibration isolator 10 can improve the ride comfort and driving stability.

On the outer end surface of the flange 24 in the O-axis direction, rubber-like stoppers 35 connected to the first wall portion 32 are provided. The stoppers 35 are integrally molded with the first wall portion 32 and second wall portions 33. The stoppers 35 abut against a flange-like member integrally formed with the head of a bolt (not shown) to restrict the movement of the first unit 20 in the O-axis direction.

On the protrusions 14 of the shaft unit 11 (see FIG. 3), rubber-like stoppers 36 integrally molded with the first wall portions 31, 32 are provided. The stoppers 36 abut against the second unit 50 to restrict the radial movement of the second unit 50. The stoppers 36 abutting against the second unit 50 can make the spring of the elastic body 30 harder to some extent in the direction in which the depressed portions 37 are formed (the up-down direction in FIG. 1).

On the outer surfaces (surfaces on the radially outside) of the coupling elements 23 (see FIG. 2), rubber outer face portions 38 are bonded by vulcanization. The outer face portions 38 are integrally molded with the first wall portions 31, 32. The outer face portions 38 are interposed between the coupling elements 23 and second unit 50. In this embodiment, one (right one in FIG. 2) of the two outer face portions 38 formed on the respective coupling elements 23 has a groove 41 on the border between a first segment 39 and a second segment 40 thereof.

The second unit 50 is press-fitted in a hole formed in a suspension member (not shown). The second unit 50 includes a hollow cylindrical main body 51, a bent portion 52 formed at one of the edges of the main body 51 in the O-axis direction, a flange 53 formed at the other edge of the main body 51 in the O-axis direction, and a bent portion 54 formed at the rim of the flange 53.

The main body 51 encloses the annular elements 21, 22, coupling elements 23, first wall portions 31, 32, and second wall portions 33. By enclosing the annular elements 21, 22, coupling elements 23, first wall portions 31, 32, and second wall portions 33 with the main body 51, liquid chambers 56, 57 are defined between the main body 51 and elastic body 30 (see FIG. 3). The liquid chambers 56, 57 are filled with an antifreeze solution (liquid), such as ethylene glycol. The groove 41 formed on the outer face portion 38 (see FIG. 2) serves as an orifice 58 between the main body 51 and coupling element 23, and the orifice 58 allows the liquid chambers 56, 57 to communicate with each other. The length and cross-sectional area of the orifice 58 determine the dynamic spring constant and damping coefficient associated with the liquid motion in the liquid-filled vibration isolator 10.

The flange 53 abuts against the flange 24 of the first unit 20 to restrict the movement of the main body 51 in the O-axis direction. The bent portions 52, 54 respectively formed in the main body 51 and flange 53 are bent radially inward to fix the second unit 50 to the first unit 20. On the outer circumferential surface of the main body 51, a plurality of ring-shaped rubber parts 55, which project radially outward and extend in the circumferential direction, are bonded with a spacing therebetween in the O-axis direction. The rubber parts 55 prevent the second unit 50 press-fitted in a hole of a suspension member (not shown) from coming off from the hole, and also improve the stability of the press-fitted second unit 50.

The liquid-filled vibration isolator 10 is manufactured by, for example, the following method. Firstly, the shaft unit 11, first unit 20, and intermediate plates 34 are placed in a mold (not shown), and rubber is poured into cavities of the mold to bond the shaft unit 11, first unit 20, and intermediate plates 34 by vulcanization, thereby manufacturing an intermediate unit 60 (see FIGS. 4 to 7). The outer diameter of the outer face portions 38 of the intermediate unit 60 is set slightly larger than the inner diameter of the main body 51 of the second unit 50.

After the second unit 50 and intermediate unit 60 are immersed in a liquid stored in a liquid bath, the intermediate unit 60 is inserted with the annular element 21 side first into the second unit 50 from the flange 53 side. The flange 24 of the intermediate unit 60, which is inserted in the second unit 50 in the O-axis direction, is brought into contact with the flange 53 of the second unit 50, and then the bent portions 52, 54 are formed at the opposite ends of the second unit 50 to fix the second unit 50 to the intermediate unit 60. These manufacturing steps provide the liquid-filled vibration isolator 10 with a liquid stored in the liquid chambers 56, 57 and orifice 58.

Figure 4:
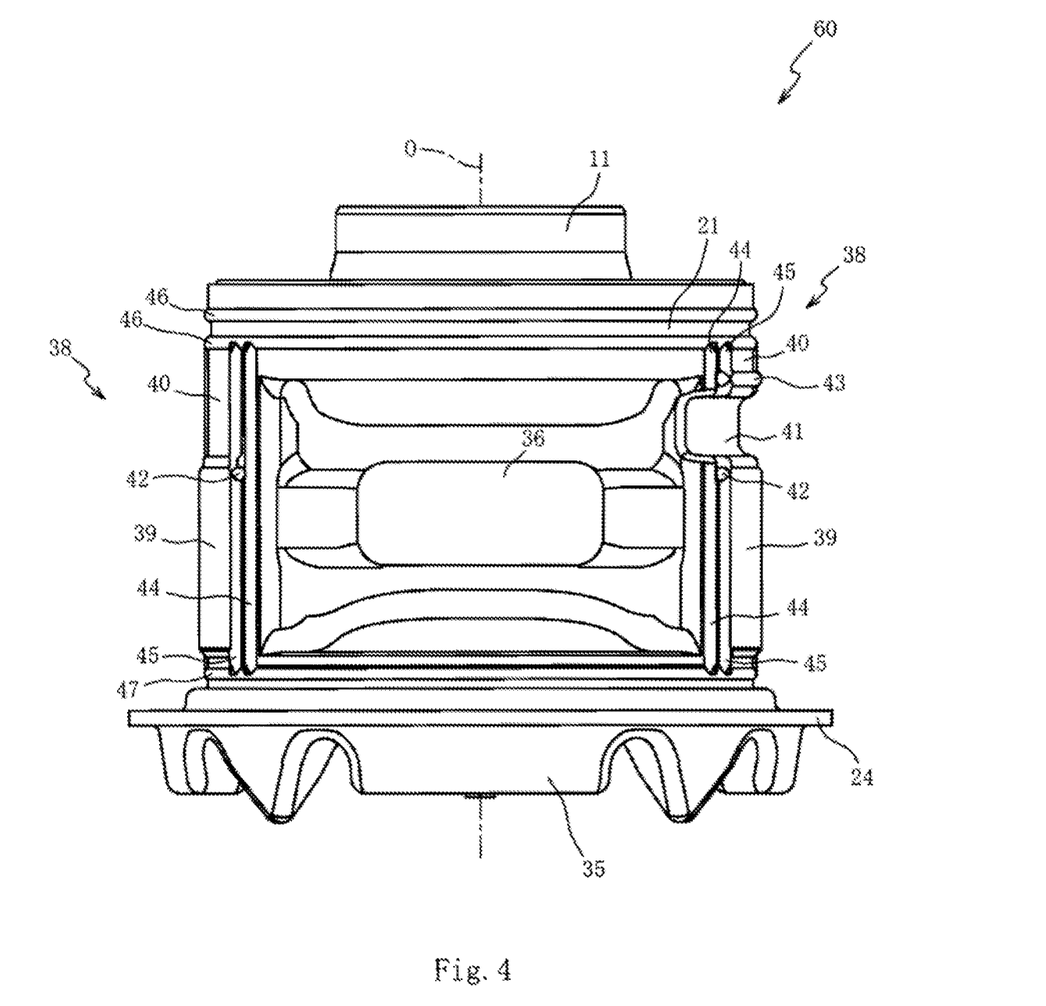
FIG. 4 is a front view of an intermediate unit as viewed in the direction of Arrow IV in FIG. 1.
Figure 5:
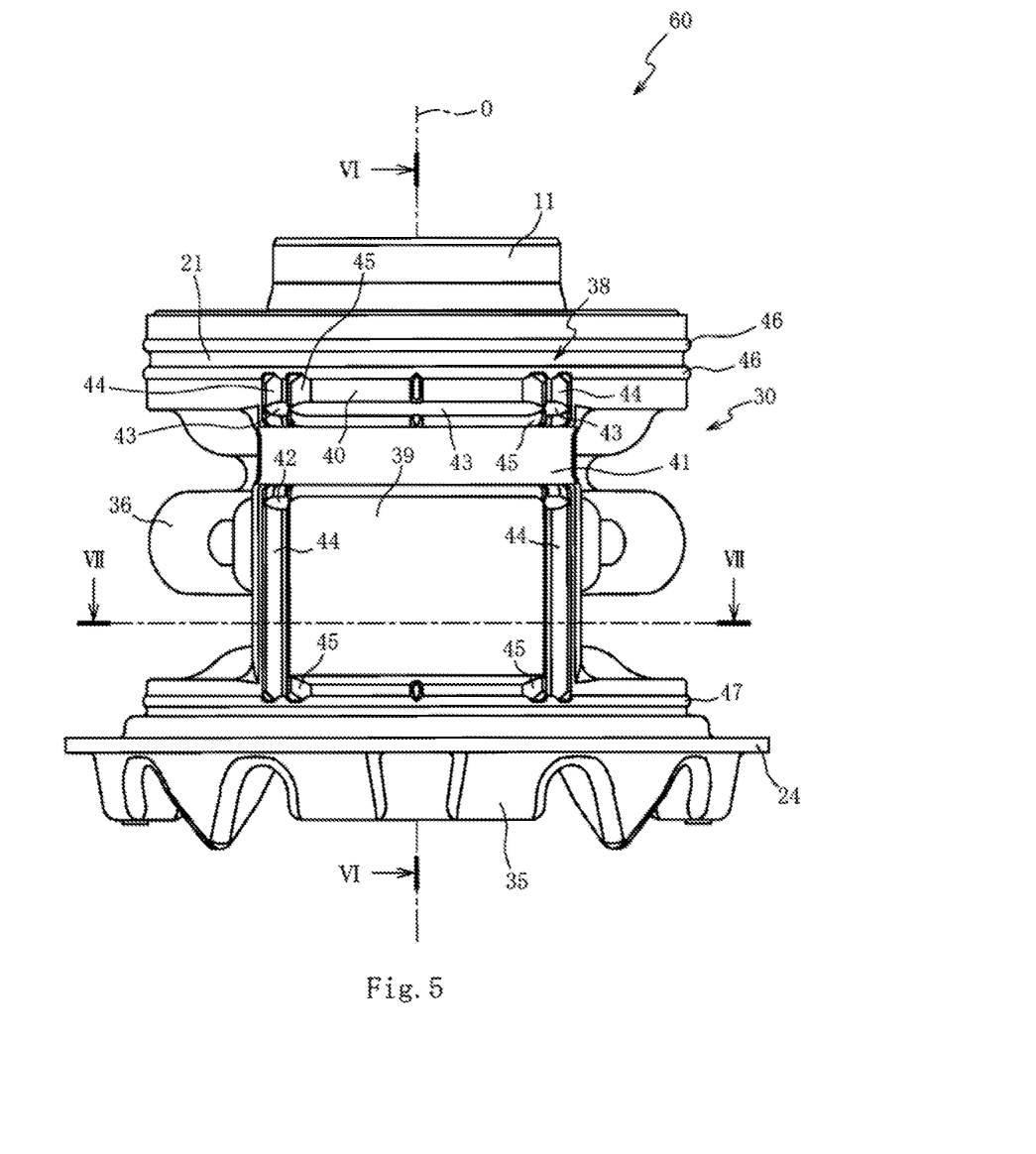
FIG. 5 is a side view of the intermediate unit as viewed in the direction of Arrow V in FIG. 1.
Figure 6:
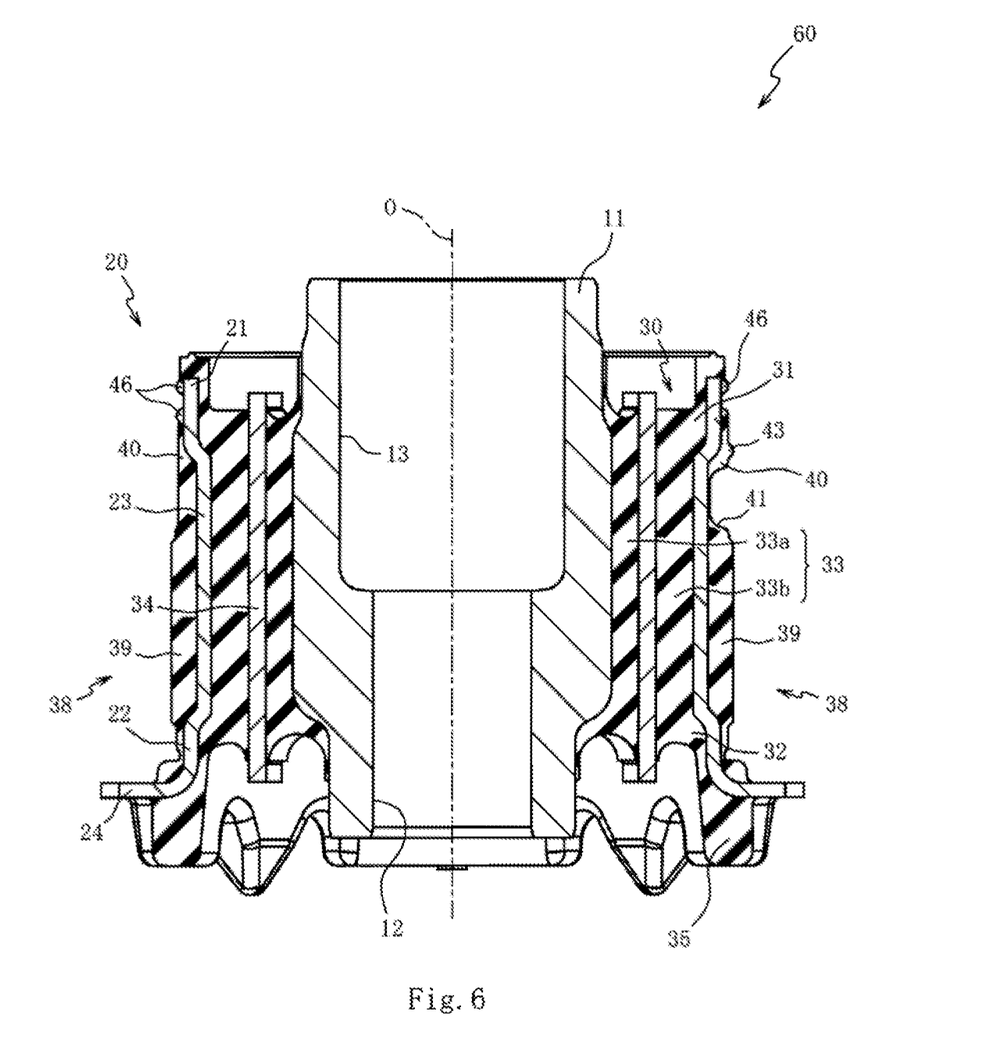
FIG. 6 is a cross-sectional view of the intermediate unit taken along Line VI-VI in FIG. 5.
Figure 7:
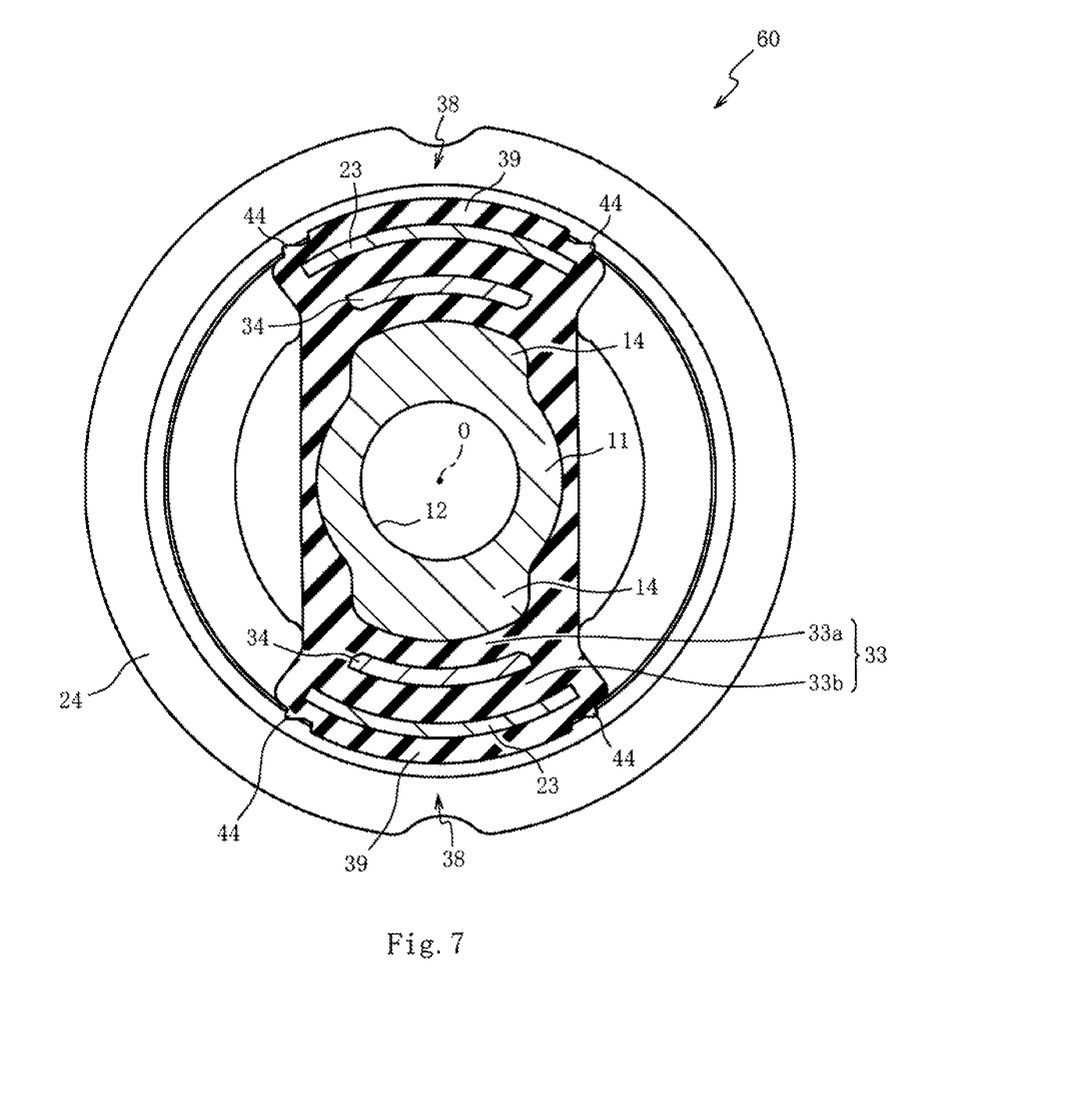
FIG. 7 is a cross-sectional view of the intermediate unit taken along Line VII-VII in FIG. 5.

Referring to FIGS. 4 to 7, the intermediate unit 60 will be described. FIGS. 4 to 7 illustrate the intermediate unit 60 before being placed inside the second unit 50. FIG. 4 is a front view of the intermediate unit 60 as viewed in the direction of Arrow IV in FIG. 1, and FIG. 5 is a side view of the intermediate unit 60 as viewed in the direction of Arrow V in FIG. 1. FIG. 6 is a cross-sectional view of the intermediate unit 60 taken along Line VI-VI in FIG. 5, and FIG. 7 is a cross-sectional view of the intermediate unit taken along Line VII-VII in FIG. 5.

As shown in FIGS. 4 and 5, the outer face portions 38 include first segments 39 and second segments 40. The first segments 39 are areas to be compressed in the radial direction by the second unit 50 (see FIG. 2). The second segments 40 are interposed between the first segments 39 and the annular element 21. One of the outer face portions 38 (right in FIG. 4) has a circumferentially-extending groove 41 foiled on the border between the first segment 39 and second segment 40 along the entire circumferential length of the outer face portion 38. The other outer face portion 38 (left in FIG. 4) does not have the groove 41 and lips 42, 43 (which will be described later). The two outer face portions 38 have the first portions 39 of the same area, and therefore the outer face portion 38 without the groove 41 has the second segment 40 larger in area by the groove 41 than the outer face portion 38 with the groove 41.

As shown in FIG. 4, the distances from the O axis to the radially outer surfaces of the second segments 40 (the radii of the second segments 40) are shorter than the distances from the O axis to the radially outer surfaces of the first segments 39 (the first distances, or the radii of the first segments 39). Since the coupling elements 23 have a constant outer diameter along the entire length in the O-axis direction, the second segments 40 are thinner in the radial direction than the first segments.

In this embodiment, the first segments 39 and second segments 40 are formed in the shape of a curved strip extending in the circumferential direction (the right-left direction in FIG. 5) of the coupling elements 23 (see FIG. 2). The first segments 39 are formed between a flange and the second segments 40. The second segments 40 are shorter in the O-axis direction than the first segments 39.

The outer face portion 38 with the groove 41 formed thereon has a plurality of lips 42, 43, 44, 45 which are elongated rubber elastic bodies. The lips 42, 43 extend in the circumferential direction, while the lips 44, 45 extend in the O-axis direction. The lips 42 are provided along an extension line extended in the circumferential direction from an edge of the first segment 39 in close vicinity of the groove 41. The lips 43 are provided along an edge of the second segment 40 in close vicinity of the groove 41 along almost the entire circumferential length of the second segment 40. The lips 44 are provided along the circumferentially opposite edges of the first segments 39 and the circumferentially opposite edges of the second segments 40 except the groove 41. The lips 45 are provided on extended lines extended in the O-axis direction from the circumferentially opposite edges of the first segments 39 along the entire length of the outer face portions 38 in the O-axis direction except the groove 41.

The distances from the O axis to the radially outer ends of the lips 42, 43, 44, 45 (second distances) are the same. The area of the first segments 39 in the outer face portions 38 is larger than the area of the lips 42, 43, 44, 45 in the outer face portions 38.

On the outer surface of the annular element 21, two parallel lips 46 are formed continuously along the entire circumferential length of the annular element 21. Likewise, a lip 47 is formed continuously on the outer surface of the annular element 22 (see FIG. 2) along the entire circumferential length of the annular element 22. The lips 46, 47 are rubber-like elastic bodies connected to the outer face portions 38 and first wall portions 31, 32. The distances from the O axis to the radially outer ends of the lips 46, 47 are the same. The distances from the O axis to the radially outer ends of the lips 46, 47 are longer than the distances (second distances) from the O axis to the radially outer surfaces of the second segments 40.

As shown in FIG. 6, the distances (second distances) from the O axis to the radially outer ends of the lips 43 are longer than the distances from the O axis to the radially outer ends of the lips 46, 47. As shown in FIGS. 6 and 7, the distances (first distances) from the O axis to the radially outer surfaces of the first segments 39 are equal to the distances from the O axis to the radially outer ends of the lips 43, 44.

The main body 51 of the second unit 50 used in this embodiment has an inner diameter smaller than the outer diameter of the intermediate unit 60 including the lips 46, 47. Since the annular elements 21, 22 are deformed into elliptic shapes due to mold shrinkage of the second wall portions 33 (elastic body 30) bonded thereto by vulcanization, the diameters of the annular elements 21, 22 at parts thereof to which the coupling elements 23 are connected, may become smaller than the diameters of the annular elements 21, 22 at the other parts thereof. Note that the annular element 22 formed with the flange 24 is less deformable than the annular element 21 during mold shrinkage of the elastic body 30.

If the annular elements 21, 22 are deformed, the elliptic annular elements 21, 22 are restored to their original circular shapes to fit themselves in the main body 51 when the intermediate unit 60 is inserted into the main body 51 of the second unit 50 after the second unit 50 and intermediate unit 60 are immersed in a liquid stored in a liquid bath. With the restoration, the annular elements 21, 22 expand in diameter at parts to which the coupling elements 23 are connected, while the annular elements 21, 22 become smaller in diameter at the other parts. At this point, the second wall portions 33 are strained and receive less radial compressive load from the second unit 50, thereby easily creating tensile strain. The tensile strain may impair the durability of the second wall portion 33 (elastic body 30).

On the other hand, the liquid-filled vibration isolator 10 has the first segments 39 on the outer face portions 38 bonded to the outer surface of the coupling elements 23. Since the diameter of the first segments 39 is larger than the inner diameter of the main body 51, the main body 51 compresses the first segments 39 when the intermediate unit 60 is inserted into the main body 51 and the annular elements 21, 22 are restored to their original circular shapes. The compressed first segments 39 relieve the tensile strain occurring in the second wall portions 33, thereby improving the durability of the second wall portions 33 (elastic body 30).

The inner walls 33a of the second wall portions 33 are thinner in the radial direction than the outer walls 33b of the second wall portions 33, and therefore the outer walls 33b, which are larger in volume than the inner walls 33a, shrink more during molding than the inner walls 33a do. On the other hand, the second unit 50 with the intermediate unit 60 inserted therein can apply a compressive load more easily onto the outer walls 33b interposed between the first unit 20 and intermediate plates 34 in comparison with the inner walls 33a interposed between the shaft unit 11 and intermediate plates 34. As a result, the tensile strain of the second wall portions 33 caused by mold shrinkage can be more easily reduced. Therefore, the durability of the second wall portions 33 (elastic body 30) can be improved.

With the intermediate unit 60 inserted in the main body 51, the lips 46, 47 are pressed against the main body 51 to seal the liquid chambers 56, 57. The main body 51 compresses the first segments 39 in the radial direction and simultaneously presses the lips 42, 43, 44, 45. The liquid in the liquid chambers 56, 57 may enter the second segments 40 which are smaller in diameter than the first segments 39. However, the lips 44, which are provided along the entire length of the outer face portions 38 in the O-axis direction, prevent the liquid from entering to the second segments 40 from the liquid chambers 56, 57.

The lips 44, 45 aligned in parallel along the O axis can improve the sealing performance. The first segments 39 and lips 45 are designed to be the same height from the O axis, the circumferential edges of the first segments 39 function as lips that block the entrance of the liquid from the liquid chambers 56, 57 into the first segments 39.

The lips 42 formed between the lips 44 and lips 45 block the entrance of the liquid from the orifice 58 (see FIG. 2) to the gaps between the lips 44, 45. The lips 43 formed on the second segments 40 block the entrance of the liquid from the orifice 58 into the second segments 40.

Since the outer face portions 38 are placed on the outer surfaces of the coupling elements 23 which are smaller in diameter than the annular elements 21, 22, the outer face portions 38 can be made thick in the radial direction. As a result, the thickness of the first segments 39, which will be radially compressed, and the depth of the groove 41, which influences the cross-sectional area of the orifice 58, can be freely designed.

Before the intermediate unit 60 is placed inside the second unit 50, the first distances from the O axis to the radially outer surfaces of the first segments 39 are equal to the second distances from the O axis to the radially outer ends of the lips 42, 43, 44, 45. Because of this, even if the hollow cylindrical second unit 50 is not provided with radially inward projections (portions capable of compressing the first segments 39), the second unit can apply a compressive load to the first segments 39. Consequently, the second unit 50 can be attached outside the intermediate unit 60 without the need to consider the orientation of the second unit 50. This can improve the workability in attachment of the second unit 50 over the intermediate unit 60.

Before the intermediate unit 60 is placed inside the second unit 50, the distances from the O axis to the radially outer surfaces of the second segments 40 are shorter than the first distances from the O axis to the radially outer surfaces of the first segments 39, and the second segments 40 are thinner in the radial direction than the first segments 39, and consequently the second segments 40 can be made smaller in volume than the first segments 39. Thus, the amount of deformation of the second segments 40 caused by friction with the second unit 50 can be reduced to be less than the amount of deformation of the first segments 39.

Consequently, when the intermediate unit 60 is inserted into the second unit 50 with the second segments 40 side first while the outer face portions 38 of the intermediate unit 60 are making contact with the second unit 50, such lessdeformable second segments 40 (groove 41) do not greatly reduce the cross-sectional area of the orifice 58. Since the cross-sectional area of the orifice does not greatly deviate from the designed value, the deviation from the designed values of dynamic spring constant and damping coefficient in association with liquid motion can be reduced.

Since the second segments 40 are shorter in the O-axis direction than the first segments 39, the cross-sectional area of the second wall portions 33 to which the first segments 39 applies a compressive load can be expanded in comparison with the case where the second segments 40 are equal in length in the O-axis direction to the first segments 39. The tensile strain is thus hardly created in the second wall portions 33, and therefore, the durability of the second wall portions 33 can be improved.

The liquid-filled vibration isolator 10 manufactured by inserting (press-fitting) the intermediate unit 60 into the second unit 50 can dispense with a process of reducing the diameter (diameter reduction process) of the second unit 50 by drawing the second unit 50 with the intermediate unit 60 inserted therein. Thus, the manufacturing procedure of the liquid-filled vibration isolator 10 can be simplified.

Although the present invention has been described with reference to the embodiment, it can be readily inferred that the invention is not limited to the embodiment and various modifications can be made without departing from the scope of the invention. For instance, the number and locations of the lips 42, 43, 44, 45, and the shape and size of the first segments 39 and second segments 40, and other factors can be appropriately changed if necessary.

Although this embodiment has described the liquid-filled vibration isolator 10 used as a body mount that elastically supports a suspension or other components of an automobile, the present invention is not limited to the embodiment. The liquid-filled vibration isolator 10 can be used as an engine mount, a motor mount, a differential mount, and other mounts in automobiles, and also as a vibration isolator for various vibrating objects in anything other than automobiles.

Although, in this embodiment, the intermediate unit 60 having the first segments 39 larger in diameter than the second segments 40 on the outer face portions 38 is prepared, and the intermediate unit 60 is fit inside the hollow cylindrical main body 51 (second unit 50) having an inner surface, the present invention is not always limited to the embodiment. It is of course possible to make the diameter of the outer face portions the same along the entire length (except for the groove 41) in the O-axis direction. In this case, radially inward projecting portions (hereinafter, referred to as "projections") are formed on the inner surface of the main body 51 to partially compress the outer face portions 38 in the radial direction, thereby applying a radial compressive load to the second wall portions 33. The parts of the outer face portions 38 against which the projections are pressed strongly are the first segments. As with the embodiment, the pressed first segments can relieve the tensile strain occurring in the second wall portions 33, thereby improving the durability of the second wall portions 33 (elastic body 30).

Although the groove 41 formed on the outer face portion 38 extends along the annular elements 21, 22, and has a constant width along the entire length of the groove 41 in this embodiment, the present invention is not always limited to the embodiment. The shape and length of the groove 41 and the direction in which the groove 41 extends can be appropriately changed according to the dynamic spring constant and damping coefficient required for the liquid-filled vibration isolator. It is of course possible, for example, to form the groove 41 so as to diagonally intersect with the annular elements 21, 22, and to change the width and depth of the groove 41 partially.

Although the orifice 58 is formed between the outer face portion 38 and second unit 50 by utilizing the groove 41 formed on the outer face portion 38 in this embodiment, the present invention is not always limited to the embodiment. As disclosed in Patent Literature 1, it is of course possible to employ an orifice member with a groove formed on an outer circumferential surface thereof. The groove of the orifice member is designed to communicate with the liquid chambers 56, 57 to serve as an orifice between the outer circumferential surface of the orifice member and the second unit 50. The material of the orifice member is appropriately selected from metals and hard synthetic resin. In the case of using the orifice member, a part of the orifice member is held between the outer face portion 38 and second unit 50 to fix the orifice member.

Although this embodiment has described the liquid-filled vibration isolator 10 manufactured by press-fitting the intermediate unit 60 in the second unit 50 without performing a drawing process on the second unit 50, the present invention is not always limited to the embodiment. It is of course possible to manufacture the liquid-filled vibration isolator by performing a drawing process on the second unit 50 with the intermediate unit 60 inserted therein. Also, in this case, the drawing process performed on the second unit 50 compresses the first segments 39 formed on the outer surfaces of the coupling elements 23, and resultantly reduces the tensile strain of the second wall portions 33, thereby increasing the durability.

Although the depressed portions 37 (recesses) are formed in the first wall portions 31, 32 of the elastic body 30 in this embodiment, the present invention is not always limited to the embodiment. It is of course possible to omit the depressed portions 37.

Although the stoppers 36 that interact with the second unit 50 are provided to the elastic body 30 in this embodiment, the present invention is not always limited thereto. It is of course possible to omit the stoppers 36 when the rigidity of the first wall portions 31, 32 is set high. In addition, in the case where the orifice member is used, it is of course possible to omit the stoppers 36 and to allow the orifice member to restrict the relative movement of the shaft unit 11 and second unit 50 in the radial direction.

Although the intermediate plates 34 are embedded in the second wall portions 33 in this embodiment, the present invention is not always limited to the embodiment. It is of course possible to omit the intermediate plates 34 in accordance with the spring property required for the second wall portions 33. The material of the intermediate plates 34 can be selected from metal, synthetic resin, or other materials with higher rigidity than the elastic body 30. It is of course possible to form a through hole in the intermediate plates 34 in the thickness direction in accordance with the spring property required for the second wall portions 33.

Although the distances (first distances) from the O axis to the radially outer surfaces of the first segments 39 are equal to the distances (hereinafter, referred to as "third distances") from the O axis to the radially outer ends of the lips 42, 43, 44, 45 in this embodiment, the present invention is not always limited to the embodiment. It is of course possible to make the first distances slightly longer than the third distances while maintaining the sealing pressure of the lips 42, 43, 44, 45. Also, in this case, the tensile strain of the second wall portions 33 can be reduced by compressing the first segments 39, while the sealing performance of the lips 42, 43, 44, 45 can be provided.

The invention claimed is:

1. A liquid-filled vibration isolator comprising:
a shaft unit extending in the direction of an axis;
a hollow cylindrical first unit enclosing the shaft unit;
an intermediate unit including an elastic body coupling the first unit to the shaft unit; and
a hollow cylindrical second unit disposed radially outside the intermediate unit, wherein
the first unit includes a pair of annular elements spaced apart from each other in the axis direction, and a pair of coupling elements coupling the annular elements and being opposed to each other with respect to the axis,
the elastic body includes a pair of first wall portions coupling the annular elements to the shaft unit along the entire circumferences of the annular elements, and second wall portions integrally molded with the first wall portions and coupling the coupling elements to the shaft unit, and the second wall portions define liquid chambers in communication with an orifice,
the elastic body includes outer face portions bonded to outer surfaces of the coupling elements,
the outer face portions include lips making contact with the second unit, and first segments provided at different positions from the lips and making contact with the second unit on areas larger than the lips, and
the second unit restrains the annular elements along the entire circumferences, and compresses the lips and the first segments in the radial direction,
before the intermediate unit is placed inside the second unit, first distances from the axis to radially outer surfaces of the first segments are equal to or longer than second distances from the axis to radially outer ends of the lips.

2. The liquid-filled vibration isolator according to claim 1, further comprising
intermediate plates interposed between the shaft unit and the first unit and embedded in the second wall portions, wherein
the intermediate plates are more rigid than the elastic body.

3. The liquid-filled vibration isolator according to claim 2, wherein
the second wall portions have inner walls between the shaft unit and the intermediate plates and outer walls between the intermediate plates and the first unit, and the inner walls are thinner in the radial direction than the outer walls.

4. A liquid-filled vibration isolator comprising:
a shaft unit extending in the direction of an axis;
a hollow cylindrical first unit enclosing the shaft unit;
an intermediate unit including an elastic body coupling the first unit to the shaft unit; and
a hollow cylindrical second unit disposed radially outside the intermediate unit, wherein
the first unit includes a pair of annular elements spaced apart from each other in the axis direction, and a pair of coupling elements coupling the annular elements and being opposed to each other with respect to the axis,
the elastic body includes a pair of first wall portions coupling the annular elements to the shaft unit along the entire circumferences of the annular elements, and second wall portions integrally molded with the first wall portions and coupling the coupling elements to the shaft unit, and the second wall portions define liquid chambers in communication with an orifice, the elastic body includes outer face portions bonded to outer surfaces of the coupling elements, the outer face portions include lips making contact with the second unit, and first segments provided at different positions from the lips and making contact with the second unit on areas larger than the lips, the second unit restrains the annular elements along the entire circumferences, and compresses the lips and the first segments in the radial direction, the outer face portions include second segments provided at different positions from the first segments, a groove serving as the orifice between the outer face portion and the second unit is formed on a border between the second segment and the first segment, the groove extending in a circumferential direction, before the intermediate unit is placed inside the second unit, distances from the axis to radially outer surfaces of the second segments are shorter than the first distances from the axis to radially outer surfaces of the first segments, and the second segments are thinner in the radial direction than the first segments.

5. The liquid-filled vibration isolator according to claim 4, wherein the second segments are shorter in the axis direction than the first segments.

6. The liquid-filled vibration isolator according to claim 4, further comprising intermediate plates interposed between the shaft unit and the first unit and embedded in the second wall portions, wherein the intermediate plates are more rigid than the elastic body.

7. The liquid-filled vibration isolator according to claim 6, wherein the second wall portions have inner walls between the shaft unit and the intermediate plates and outer walls between the intermediate plates and the first unit, and the inner walls are thinner in the radial direction than the outer walls.

* * * * *